Patented Jan. 13, 1953

2,625,521

UNITED STATES PATENT OFFICE 2,625,521

STABILIZED PLASTIC COMPOSITIONS OF CHLORINE-CONTAINING VINYL RESINS

Wilbur F. Fischer, Roselle Park, and David W. Young, Roselle, N. J., assignors to Standard Oil Development Company, a corporation of Delaware No Drawing. Application June 15, 1950, Serial No. 168,372

8 Claims. (Cl. 260—23)

This invention essentially relates to improvements in plastic compositions containing vinyl chloride polymers or copolymers, and to methods of improving the resistance of such compositions to the deleterious effects of oxygen, heat and light. In particular, this invention relates to vinyl chloride-acetate resins containing a branched-chain ester such as isooctyl phthalate as plasticizer and a bisphenol compound such as diphenylol propane as stabilizer.

The ever expanding use of plastics such as vinyl chloride polymers, vinyl chloride-acetate copolymers, polyvinyl chloride, polyvinylidene chloride, vinylidene chloride-vinyl chloride copolymers and similar chlorine-containing aliphatic polyvinyl resins has created a large demand for plasticizers capable of rendering such plastics both easier to process and more pliable in use.

Various esters have been used for this purpose. Dibutyl phthalate and di-n-octyl phthalate have been among the esters used, but branched-chain alkyl esters such as those obtained by the esterification of phthalic acid or anhydride, phosphoric acid, adipic, or sebacic acid with a branched-chain alcohol of 7 to 12 carbon atoms have found particularly wide acceptance in the art because of their non-fugitivity, high plasticizing action and low-temperature effectiveness. Among these, branched-chain octyl esters of phthalic, phosphoric, adipic and sebacic acid are probably the ones most prevalently used.

The most important alcohols used in the preparation of these esters are 2-ethylhexyl alcohol and the synthetic isooctyl alcohol produced by the well-known oxo process. A typical commercial isooctyl alcohol of the latter kind may consist of about 25%, 4,5-dimethyl hexanol, 30% 3,5-dimethyl hexanol, 20% 3,4-dimethyl hexanol, 15% 3-methyl heptanol and/or 5-methyl heptanol and about 10% of other isomers. It will be seen that the synthetic alcohol consists of isomers having at least one tertiary carbon atom, and actually contains a great preponderance, or at least 60 to 85%, of isomers having two tertiary carbon atoms.

Illustrative descriptions of the oxo process and its principles can be found, for instance, in U. S. Patent 2,327,066 and in the U. S. Bureau of Mines Publication R1 4270 "Critical Review of Chemistry of the Oxo Synthesis (1948)." Description of various typical esters derived from the oxo alcohols and the preparation of the former, can be found in U. S. patent application Serial No. 91,424 of Smith and Young, filed on May 4, 1949, which is incorporated herein by reference.

However, despite the high mechanical effectiveness of the aforementioned plasticizers, the use of chlorine-containing polyvinyl plastics has been heretofore limited because of a pronounced tendency of the plastic compositions to discolor and gradually become opaque on aging. Since it has long been desired to fabricate polyvinyl resins into colorless or transparent films which usually are intended to serve in a function which is at least in part decorative, such a change in appearance has been found objectionable and has seriously restricted this use of the resins. This deterioration has been ascribed to the known inherent instability of the vinyl chloride type polymers, due to both oxidation and dehydrochlorination, the latter being autocatalytic in nature once started.

Prior efforts were therefore directed principally to the discovery of efficient stabilizers for the polymer itself. This has resulted in the formulation of plastic compositions whose stability has been improved by means of various basically reacting compounds of metals of the second and fourth group of the periodic table such as basic lead salts, tin compounds, barium salts of organic acids, or even alkaline metal salts of weak organic acids of about 4 to 10 or 18 carbon atoms, the characteristic of these known stabilizers being their ability to react with the hydrogen chloride liberated in the decomposition of the resin.

Typical known materials more or less useful as resin stabilizers include:

Dibasic lead stearate, 2 PbO. Pb($C_{17}H_{35}$COO)$_2$
Lead orthosilicate, or preferably coprecipitated lead orthosilicate and silica gel
Normal lead salicylate
Monohydrous tribasic lead maleate,

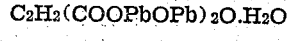

Barium ricinoleate, or preferably barium ricinoleate modified with 2-ethyl hexanoic acid
Cadmium ricinoleate, which may be modified with 2-ethyl hexanoic acid
Dibasic lead carbonate
Sodium citrate
Monohydrous tribasic lead sulfate,

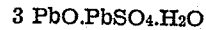

Dibasic lead phosphite, 2 PbO.PbHPO$_3$.½H$_2$O
Dibasic lead phthalate, $C_6H_4$(COOPbO)$_2$Pb
Dibutyl tin dilaurate
Cadmium naphthenate
Dibutyl tin diacetate
Basic lead hydroxynaphthenate
Various organic strontium salts;

as well as certain sodium organophosphate compositions known as "Vanstay" (chemical analysis: 16.67% Na; 8.33% P; 49.12% ash); and also certain boron compounds such as the one known as "Stabelan A" (chemical analysis: 9.17% Na; 5.21% B; 3.59% P; 7.78% Ca; 51.33% ash); and the like.

These metal compounds can be used in concentrations ranging from about 0.5 to 5 percent based on the polyvinyl chloride resin. Dibutyl tin dilaurate, dibasic lead stearate, barium ricinoleate and the like are particularly preferred since they give clear, transparent polyvinyl chloride compositions whereas some of the other stabilizers such as dibasic lead carbonate are insufficiently soluble in the resin and consequently cause noticeable opacity.

However, where branched-chain ester plasticizers were present in the chlorinated vinyl resin, the improvement in stabilization obtained with any of the forementioned conventional stabilizers was still unsatisfactory. In particular, more or less severe discoloration and loss of transparency have been encountered where articles produced from the plasticized polyvinyl chloride type resins were subjected to prolonged exposure to heat and light, e. g., in curtains, table covers, upholstery, wire insulation and the like.

The principal object of the present invention is the formulation of stable systems containing a polyvinyl chloride type resin plasticized with a branched-chain alkyl ester, i. e. an ester containing one or more tertiary or even quaternary carbon atoms. Another object is to minimize discoloration and loss of transparency of such plastic systems, for which purpose the conventional metal compounds heretofore used as resin stabilizers have proved inadequate. Still other objects will be apparent from the subsequent description.

It has now been discovered that the stability of chlorine-containing vinyl resins plasticized with branched-chain esters may be increased to a surprising extent by adding to the plastic composition a bisphenol type of stabilizer capable of preventing oxidation of the branched-chain ester and also largely arresting the degradation of the resin itself, which degradation otherwise seems at least partially aggravated by the presence of the ester. Thus, the presence of about 0.1 to 5% of the novel anti-oxidant stabilizer alone is often sufficient to prevent degradation of the plasticized resin to the desired extent, though for perfect results it is preferable to use the bisphenol stabilizer in combination with a small amount of a conventional stabilizer of the metal salt type. In particular, additions of about 0.01 to 5%, preferably 0.05 to 1% of the bisphenol stabilizer plus 0.5 to 5%, preferably 1.5 to 3% of a metal compound such as lead stearate and/or another hydrogen chloride acceptor have been found most advantageous, all proportions throughout this specification and the appended claims being based on the weight of chlorinated resin unless otherwise stated.

The improvement obtained in this manner is most surprising since even a relatively large amount of 1% or more of the bisphenol stabilizer by itself does not protect the resin fully from discoloration, nor, conversely, does an increase in concentration of the conventional stabilizer of the metal compound type alone protect the plasticized resin composition from deterioration. Moreover, high concentrations of the metal-containing stabilizers are generally undesirable because they seriously impair the clarity and transparency of the resin when present in concentrations approaching 8 to 10% based on the resin, and often even at substantially lower concentrations. Thus, it can be said that while the bisphenol compounds subsequently described can serve as substitutes for the conventional stabilizers under moderate conditions, when the bisphenol compounds are present in the resinous compositions in conjunction with a conventional stabilizer, the combination of the two gives an effect which greatly exceeds the mere sum of the effects produced by each type of stabilizer individually.

The preferred bisphenol stabilizer useful in this invention is 2,2-bis(4-hydroxyphenyl)propane, hereafter referred to simply as diphenylol propane. Similarly, other bisphenol compounds which are more or less effective can best be described by the formula

wherein $R_1$ is an alkyl radical of 1 to 4 carbon atoms, $R_2$ is an alkyl radical of 1 to 2 carbon atoms, and $R_3$ and $R_4$ are hydroxyphenyl groups, monochlorinated hydroxyphenyl groups or monoalkylated hydroxyphenyl groups having 1 to 3 carbon atoms per alkyl group. In general, stabilizer compounds wherein $R_3$ and $R_4$ represent p-hydroxyphenyl groups are most advantageous. Representative compounds of this class are 2,2-bis(4-hydroxyphenyl) butane; 3,3-bis(4-hydroxyphenyl) hexane; 2,2 - bis(4 - hydroxy-3-methylphenyl) propane; 2,2-bis(4-hydroxy-3-isopropyl phenyl) propane; 2,2-bis(2-hydroxy-5 - chlorophenyl) butane; as well as related substances wherein the two phenol groups are linked together by means of a sulfide group, —S—, or sulfoxide group,

instead of the alkylidene radical

shown in the above formula. Useful bisphenol compounds having such a sulfur linkage include bis(2-hydroxy-5-methylphenyl) sulfide, bis(2-hydroxy-5-chlorophenyl) sulfide, and bis(2-hydroxy-5-methylphenyl) sulfoxide.

Useful compounds of the class described are prepared by condensing in a known manner two mols of phenol or an alkylated phenol such as a cresol with one mol of a ketone such as acetone, methyl ethyl ketone, methyl isobutyl ketone or ethyl butyl ketone. The chlorinated bisphenols are best obtained by chlorination of the appropriate condensation product. Similarly, the sulfur-linked bisphenols can be obtained in a known manner by condensing two mols of phenol with sulfur dichloride or thionyl chloride.

The compounds described above must be distinguished from more or less related phenolic compounds wherein the phenol groups contain more than one alkyl substituent as in 2,6-di-tert-butyl-4-methyl phenol or 2,2-bis(2-hydroxy-3-t-butyl-5-methylphenyl) propane. The polysubstituted phenolic compounds are unsuited for the purposes of the present invention not only because of their inherent yellow or even brown color but also because the alkyl substituents block the stabilizing action of the bisphenol compounds of the present invention. A possible explanation for the unusual effectiveness of the latter compounds may be found in their ability to alkylate onto polyvinyl chloride type molecules when hydrogen chloride is split off during aging. Thus a saturated structure is retained even after the hydrogen chloride is split off, whereas in the absence of the bisphenol stabilizer the hydrogen chloride split off gives rise to a relative unstable olefinic linkage which opens up the resin molecule to further attack.

The compounds of the present invention must also be distinguished from the somewhat similar bisphenol compounds obtainable by condensation of a phenol with an aldehyde. In the latter instance the resulting condensation products are less effective, probably due to their high-molecular weight fractions, i. e., fractions comprising polymeric molecules produced by condensation of more than two mols of phenol and one mol of aldehyde.

The present invention, relating to the stabilization of polyvinyl chloride type compositions containing 20 to 80, or preferably 30 to 60 parts of an alkyl ester plasticizer per 100 parts of the polyvinyl resin, is further illustrated by the subsequent specific examples.

EXAMPLE 1

Three compounds were blended on a rubber mill at a temperature of 300° F. according to the formulas listed below. When a uniform blend was obtained, it was molded into 6" x 6" x 0.075" pads at 320° F. and these pads were subjected to accelerated aging in an air circulating oven maintained at 212° F. The physical properties and appearance of the original samples and also of samples aged for 5 and 8 days respectively were determined as shown in Table I.

pound 3. Incidentally, a comparison of the data obtained on compounds 1 and 2 shows that the composition plasticized with diisooctyl phthalate deteriorates more rapidly in appearance as well as in physical properties than the composition plasticized with diethyl hexyl phthalate. This indicates that the greater the degree of branching in the ester, the greater is the susceptibility to deterioration, although even in the case of compositions containing straight-chain esters such as di-n-octyl phthalate a distinct advantage in light and heat stability can be obtained by means of the present invention.

The data such as are obtained with the aid of diphenylol propane cannot be duplicated when some of the more conventional anti-oxidants are used instead. For instance, amino compounds such as phenylbetanaphthylamine are necessarily ruled out because of their notorious color-forming tendencies. However, even the so-called non-staining anti-oxidants of the prior art such as 2,6-di-tert-butyl-4-methyl phenol or other phenols or naphthols do not compare with diphenylol propane as color inhibitors for the resin. Moreover, the stabilizing effectiveness of the prior art phenols is greatly impaired because of their considerable volatility and the consequent loss of these agents from the resinous compositions even during processing operations such as hot mixing or molding. This relative ineffectiveness of the prior art anti-oxidant is illustrated by the data obtained on compound 4.

EXAMPLE 2

Diphenylol propane as a stabilizer for ester plasticized resinous compositions was further compared with other individual and mixed stabilizers as shown below. The samples were prepared by the procedure described earlier in Example 1, the various compounding formulas being listed in Table II along with the data obtained thereon. In this instance the change in appearance was determined quantitatively in terms of percentages of light transmission and the qualitative changes in appearance were noted as well.

The data obtained on compounds 1–3, 7 and 9

*Table I*

| Compound Number | 1 | 2 | 3 | 4 |
|---|---|---|---|---|
| Polyvinyl chloride-acetate[1] (Geon 101) | 100.0 | 100.0 | 100.0 | 100.0 |
| Di-2-ethylhexyl phthalate | 50.0 | | | |
| Di-isooctyl phthalate [2] | | 50.0 | 50.0 | 50.0 |
| Sodium organo phosphate, "Vanstay" | 2.0 | 2.0 | 2.0 | 2.0 |
| Lead stearate, dibasic | 1.0 | 1.0 | 1.0 | 1.0 |
| Diphenylol propane | | | 0.1 | |
| 2,6-di-tert-butyl-4-methyl phenol | | | | 0.1 |
| Original Properties: | | | | |
| Tensile, lbs./sq. in | 2,945 | 3,020 | 3,095 | 2,974 |
| Elongation, percent | 320 | 325 | 305 | 317 |
| Modulus at 100% el | 1,715 | 1,785 | 1,825 | 1,770 |
| Appearance | Clear—Transp | Clear—Transp | Clear—Transp | Clear—Transp |
| Aged 5 days at 212° F.: | | | | |
| Tensile, lbs./sq. in | 2,175 | 2,000 | 2,915 | 2,220 |
| Elongation, percent | 185 | 125 | 285 | 150 |
| Modulus at 100% el | 1,895 | 1,930 | 2,055 | 2,080 |
| Percent tensile retained | 74 | 66 | 94 | 74.6 |
| Percent elongation retained | 58 | 38 | 94 | 47.3 |
| Appearance | Gray—Opaque | Brown—Opaque | V. sl. tan tint—Transparent | White—Opaque |
| After 8 days at 212° F.: | | | | |
| Tensile, lbs./sq. in | 1,085 | 665 | 3,005 | 828 |
| Elongation, percent | 0 | 0 | 240 | 0 |
| Modulus at 100% el | | | 2,425 | |
| Percent tensile retained | 37 | 22 | 97 | 27.8 |
| Percent elongation retained | 0 | 0 | 79 | 0 |
| Appearance | Brown—Opaque | Brown—Opaque | V. sl. tan tint—Transparent | Brown—Opaque |

[1] Proportion of monomers 95/5.
[2] Derived from an Oxo octyl alcohol whose principal isomeric constituents were 3,5-dimethyl hexanol; 4,5-dimethyl hexanol and 3,4-dimethyl hexanol.

The aging data of Table I clearly demonstrate the improvement in stabilization obtained by addition of a relatively minute amount of diphenylol propane to the resinous composition, the improvement being reflected both in a high degree of retention of physical properties and in the virtually unchanged appearance of comshow that the metal-containing stabilizers of the prior art afford only very incomplete protection against degradation of tensile properties and of appearance. In contrast, compounds 4, 5, 8 and 10 show that the further addition of diphenylol propane to the conventional formula virtually eliminates discoloration as well as impairment of tensile properties. Furthermore, compound 6 demonstrates that even in the complete absence of metal-containing stabilizers diphenylol propane alone is capable of preventing any substantial impairment of tensile properties, although a slight color formation is noticeable in this instance, as contrasted with the negligible change in transparency of compounds 4, 5, 8 and 10 wherein diphenylol propane was present in conjunction with conventional hydrogen chloride acceptors. Moreover, a comparison of compounds 9 and 10 shows again that even in the case of a less branched ester the loss of transparency can be prevented by means of a bisphenol compound such as diphenylol propane.

The data show that essentially complete protection against heat degradation of both tensile properties and appearance of the resin is obtained when the bisphenol compound is present in a concentration of at least 0.01% based on the weight of the resin. Smaller concentrations are ineffective as shown by the aging data of compound 2. At the same time it can be observed that in the further presence of about 1 to 5 percent of metal-containing stabilizer only a slight advantage is obtained for the relatively short test period by increasing the concentration of the bisphenol compound above about 0.3%.

In fact, compounds 6 and 7 demonstrate that higher bisphenol concentrations, while contributing to the long-run stability of the resin, sharply reduce the light transmission of the stabilized resin and thus cause an opacity which may be tolerable only in pigmented compounds. The opacity is due to the limited solubility of the bisphenol stabilizer in the resin which also comprises metal-containing stabilizers. And while

*Table III*

| Compound No. | 1 | 2 | 3 | 4 | 5 | 6 | 7 |
|---|---|---|---|---|---|---|---|
| Diphenylol propane, parts per 100 parts resin | None | 0.004 | 0.01 | 0.025 | 0.13 | 0.75 | 2.0 |
| Original properties: | | | | | | | |
| Tensile strength, lbs./sq. in. | 3,025 | 2,995 | 3,125 | 2,995 | 2,935 | 3,105 | 3,035 |
| Elongation, percent | 295 | 280 | 285 | 290 | 280 | 295 | 305 |
| Modulus at 100% el. | 1,960 | 1,950 | 2,115 | 2,105 | 2,020 | 1,995 | 2,075 |
| Light transmission, percent | 80 | 80 | 80 | 81 | 79 | 23 | 23 |
| Oven-aged, 5 days at 100° C.: | | | | | | | |
| Tensile strength, lbs./sq. in. | 2,230 | 2,415 | 2,905 | 2,860 | 2,865 | 2,860 | 2,855 |
| Elongation, percent | 100 | 115 | 265 | 285 | 260 | 275 | 275 |
| Modulus at 100% el. | 2,230 | 2,240 | 2,340 | 2,305 | 2,315 | 2,190 | 2,265 |
| Retained tensile, percent | 74 | 81 | 93 | 96 | 98 | 92 | 94 |
| Retained elongation, percent | 34 | 41 | 93 | 98 | 93 | 93 | 90 |
| Light transmission, percent | 19 | 20 | 76 | 77 | 78 | 20 | 20 |
| Oven-aged 7 days at 100° C.: | | | | | | | |
| Tensile strength, lbs./sq. in. | 1,635 | 1,320 | 2,955 | 2,695 | 2,785 | 2,895 | 2,885 |
| Elongation, percent | 75 | 40 | 260 | 265 | 250 | 260 | 270 |
| Modulus at 100% el. | | | 2,370 | 2,200 | 2,305 | 2,430 | 2,515 |
| Retained tensile, percent | 54 | 44 | 95 | 90 | 95 | 93 | 95 |
| Retained elongation, percent | 25 | 14 | 91 | 91 | 89 | 88 | 89 |
| Light transmission, percent | 18 | 18 | 76 | 75 | 75 | 20 | 20 |

*Table II*

| Compound No. | 1 | 2 | 3 | 4 | 5 | 6 | 7 | 8 | 9 | 10 |
|---|---|---|---|---|---|---|---|---|---|---|
| Polyvinyl chloride-acetate (Geon 101) | 100 | 100 | 100 | 100 | 100 | 100 | 100 | 100 | 100 | 100 |
| Diisooctyl phthalate (Oxo) | 50 | 50 | 50 | 50 | 50 | 50 | 50 | 50 | | |
| Di-2-ethylhexyl phthalate | | | | | | | | | 50 | 50 |
| Dibasic lead stearate | 1 | | 1 | 1 | 1 | | | | 1 | 1 |
| Sodium organo phosphate, "Vanstay" | | 2 | 2 | | 2 | | | | 2 | 2 |
| Diphenylol propane | | | | 0.13 | 0.13 | 1 | | 0.13 | | 0.13 |
| Stabelen E | | | | | | | 2 | 2 | | |
| Original properties: | | | | | | | | | | |
| Tensile, lbs./sq. in. | 3,085 | 3,080 | 3,000 | 3,120 | 3,130 | 3,150 | 3,045 | 3,120 | 2,980 | 2,970 |
| Elongation, percent | 300 | 255 | 295 | 305 | 275 | 315 | 315 | 285 | 280 | 285 |
| Modulus at 100% el. | 1,945 | 2,245 | 1,950 | 1,975 | 2,065 | 2,000 | 1,910 | 2,040 | 2,015 | 1,820 |
| Light transmission, percent | 79 | 79 | 75 | 80 | 78 | 78 | 90 | 90 | 82 | 78 |
| Appearance | (1) | (1) | (1) | (1) | (1) | (1) | (1) | (1) | (1) | (1) |
| Aged 7 days at 100° C.: | | | | | | | | | | |
| Tensile, lbs./sq. in. | 1,035 | 1,580 | 1,465 | 3,170 | 3,245 | 3,100 | 1,885 | 3,140 | 2,630 | 2,625 |
| Elongation, percent | 20 | 35 | 35 | 265 | 225 | 265 | 60 | 230 | 175 | 245 |
| Modulus at 100% el. | | | | 2,715 | 2,835 | 2,555 | | 2,715 | 2,425 | 2,165 |
| Retained tensile, percent | 34 | 51 | 49 | 102 | 104 | 98 | 62 | 101 | 88 | 88 |
| Retained elongation, percent | 7 | 16 | 12 | 87 | 82 | 84 | 19 | 81 | 63 | 86 |
| Light transmission, percent | 0 | 37 | 15 | 69 | 74 | 62 | 44 | 84 | 18 | 74 |
| Appearance | (2) | (3) | (4) | (1) | (1) | (5) | (3) | (6) | (4) | (1) |

¹ Clear—Transparent.   ² Grey—Opaque.   ³ Brown—Mottled.   ⁴ White—Opaque.   ⁵ Tan—Transparent.   ⁶ Slightly yellow—Transparent.

EXAMPLE 3

The bisphenol compounds are useful for purposes of the present invention at surprisingly low but none the less critical concentrations. This is illustrated by the data of Table II, obtained on samples prepared and molded according to the procedure of Example 1. The recipe used in determining the concentration effect of bisphenol stabilizer was as follows:

Parts by weight
Polyvinyl chloride-acetate resin (Geon 101)__ 100
Diisooctyl phthalate (oxo) _____ 50
Dibasic lead stearate _____ 2
Diphenylol propane _____ As indicated the clarity of such a resinous composition may be improved by separately dissolving the bisphenol stabilizer in the ester and thereafter adding the mixture to the resin instead of adding solid bisphenol directly to the resinous composition, in general concentrations above 0.2% bisphenol stabilizers are not recommended for clear compounds where metal-containing stabilizers are also present.

However, the above suggested upper limit does not apply where a bisphenol compound is used in the absence of metal-containing stabilizers. This was illustrated in previous Example 2, where compound 6 retained high light transmission in the presence of 1% of diphenylol propane. In that instance, however, slight color formation occurred during aging, indicating that the use of a conventional hydrogen chloride acceptor as an auxiliary stabilizer may be desirable along with the novel bisphenol stabilizers where no color change can be tolerated in the finished article.

EXAMPLE 4

While in the foregoing examples diphenylol propane has been used to illustrate the merits of the present invention, the subsequent data show that other bisphenol compounds of the proper type are also similarly useful, though most of them are not true equivalents of diphenylol propane because of their somewhat inferior ability to give full protection against loss of clarity.

In comparing the various bisphenol compounds, samples were prepared and molded by the procedure described earlier in Example 1. The following compounding recipe was used in each case:

| | Parts |
|---|---|
| Polyvinyl chloride-acetate (Geon 101) | 100 |
| Diisooctyl phthalate (oxo) | 50 |
| Dibasic lead stearate | 2 |
| Bisphenol stabilizer (as indicated below) | 0.13 |

The following bisphenol stabilizers were used in the several resin compositions evaluated in Table IV:

| Composition No. | Stabilizer | Code |
|---|---|---|
| 1 | None | None. |
| 2 | 2,2-bis(4-hydroxphenyl) propane | A. |
| 3 | 2,2-bis(4-hydroxyphenyl) butane | B. |
| 4 | 2,2-bis(4-hydroxy-3-methylphenyl) propane | MeA. |
| 5 | 2,2-bis(4-hydroxy-3-isopropyl phenyl) propane | C₃A. |
| 6 | 2,6-bis(2-hydroxy-5-methylbenzyl)-4-methyl phenol. | X. |
| 7 | Bis(2-hydroxy-5-chlorophenyl) sulfide | ClS. |
| 8 | Bis(2-hydroxy-5-methylphenyl) sulfide | MeS. |
| 9 | Bis(2-hydroxy-5-methylphenyl) sulfoxide | MeSO. | that the methylated bisphenol is a less potent stabilizer than the unalkylated bisphenols. This increasingly detrimental effect of alkylation is still further illustrated by composition 5 wherein the stabilizer contains isopropyl-substituted phenol groups. The potency of this stabilizer to prevent opaqueness is substantially inferior not only to its unalkylated homologue, but even to its methylated one.

The adverse effect of chemical complexity on the activity of the bisphenol stabilizer, particularly in regard to its ability to prevent opaqueness, is even more clearly apparent in composition 6 wherein the stabilizer used had the formula

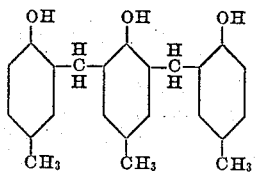

In the presence of this stabilizer a loss of light transmission of about 23% was incurred after 7 days at 100° C., as opposed to a slight actual increase in light transmission in compositions 2 and 3 containing the preferred stabilizer species.

Compositions 7-9 illustrate the utility of bisphenol compounds containing a sulfide or a sulfoxide linkage.

The foregoing examples serve to illustrate various aspects of the present invention, but it will be understood that the latter is not restricted thereto and that numerous variations may be devised without departing from the scope and spirit hereof. For instance, while only phthalic acid esters have been used in the foregoing examples, the invention is equally applicable to polyvinyl chloride type compositions plasticized with other esters.

The invention is most unobviously effective in stabilizing all such compositions plasticized with branched-chain esters, and especially those derived from alcohols having at least two tertiary

*Table IV*

| Composition No. | 1 | 2 | 3 | 4 | 5 | 6 | 7 | 8 | 9 |
|---|---|---|---|---|---|---|---|---|---|
| Stabilizer (code) | None | A | B | MeA | C₃A | X | ClS | MeS | MeSO |
| Original: | | | | | | | | | |
| Tensile, lbs./sq. in | 3,045 | 3,020 | 2,995 | 3,025 | 2,930 | 2,950 | 2,930 | 2,990 | 2,910 |
| Elongation, percent | 290 | 290 | 310 | 310 | 300 | 305 | 305 | 275 | 290 |
| Modulus at 100% elong | 2,000 | 1,995 | 1,885 | 1,895 | 1,885 | 1,815 | 1,865 | 1,985 | 1,945 |
| Light transmission, percent | 76 | 77 | 80 | 81 | 74 | 77 | 79 | 67 | 81 |
| Oven aged, 4 days at 100° C.: | | | | | | | | | |
| Tensile, lbs./sq. in | 2,660 | 2,995 | 3,010 | 3,050 | 3,090 | 3,105 | 3,105 | 3,180 | 3,115 |
| Elongation, percent | 225 | 275 | 275 | 275 | 265 | 280 | 275 | 250 | 255 |
| Modulus at 100% | 2,295 | 2,325 | 2,265 | 2,240 | 2,350 | 2,180 | 2,230 | 2,350 | 2,290 |
| Tensile retained, percent | 87 | 99 | 101 | 101 | 106 | 105 | 106 | 106 | 107 |
| Light transmission, percent | 26 | 78 | 79 | 77 | 65 | 61 | 72 | 67 | 73 |
| Oven aged, 7 days at 100° C.: | | | | | | | | | |
| Tensile, lbs./sq. in | 2,195 | 2,980 | 2,920 | 2,985 | 2,900 | 2,920 | 2,950 | 3,070 | 3,035 |
| Elongation, percent | 105 | 265 | 270 | 275 | 255 | 255 | 265 | 265 | 265 |
| Modulus at 100% | 1,605 | 2,305 | 2,250 | 2,240 | 2,280 | 2,390 | 2,370 | 2,390 | 2,430 |
| Tensile retained, percent | 72 | 99 | 98 | 99 | 99 | 99 | 102 | 103 | 104 |
| Elongation retained | 36 | 91 | 87 | 89 | 85 | 84 | 87 | 96 | 91 |
| Light transmission, percent | 18 | 83 | 83 | 79 | 66 | 56 | 77 | 68 | 76 |

The results summarized in Table IV illustrate that diphenylol propane (composition 2) and diphenylol butane (composition 3) are outstanding stabilizers for plasticized polyvinyl chloride resins. In the presence of these agents the resinous compositions retain their clarity completely and their elastic properties remain substantially unaltered even after severe aging tests. Composition 4 illustrates that slight alkylation of the phenol ring makes the solubility of the bisphenol stabilizer in the original plastic composition better as indicated by improved light transmission, but the light transmission data after aging indicate carbon atoms, which have heretofore presented a particularly difficult stabilization problem. For example, the present invention allows effective stabilization of polyvinyl chloride type compositions plasticized with C₇ to C₁₃ branched chain alkyl esters such as di-isooctyl sebacate, di-isooctyl azelate, di-isoheptyl sebacate, di-isononyl adipate, di-isooctyl tetrahydrophthalate, tri-isooctyl aconitate, tri-isooctyl phosphate, di-isodecyl glycolate, di-isooctyl adipate, di-isoheptyl phthalate, di-isononyl phthalate, tri-isooctyl tricarballylate, di-isotridecyl maleate, di-isotridecyl carbonate, di-isotridecyl oxalate, isotridecyl laurate, isotridecyl isotridecanoate and the like.

It will also be understood that while the invention is most valuable in conjunction with esters derived from highly branched alcohols, and which esters appear to have a catalytic effect on the decomposition of polyvinyl chloride type resins, the invention is also highly useful in connection with compositions containing only single-branched isoalkyl esters such as the esters of 2-ethylhexanol, and even esters of unbranched alcohols such as n-octanol, since the bisphenol compounds of the invention significantly improve the aging characteristics of all ester-plasticized polyvinyl chloride type compositions.

We claim:

1. A plastic composition of matter comprising a resinous vinyl chloride polymer, a neutral branched chain alkyl ester, having 7 to 13 carbon atoms per alkyl group, of a polybasic acid, and 0.01 to 5% by weight of polymer of a bisphenol stabilizer having the formula R—X—R', wherein X is selected from the group consisting of 2,2-alkylidene groups having 3 to 6 carbon atoms, 3,3-alkylidene groups having 5 to 7 carbon atoms, sulfur, and sulfoxide; and wherein R and R' are selected from the group consisting of hydroxyphenyl radicals, monochlorinated hydroxyphenyl radicals and monoalkyl substituted hydroxyphenyl radicals having 1 to 3 carbon atoms per alkyl group.

2. A plastic composition of matter comprising a major proportion of a resinous copolymer of vinyl chloride and vinyl acetate, a minor proportion of a neutral branched-chain alkyl ester, having 7 to 13 carbon atoms per alkyl group, of an organic acid selected from the group consisting of dibasic and tribasic organic acids, and 0.05 to 1% by weight of copolymer of a bisphenol stabilizer having the formula

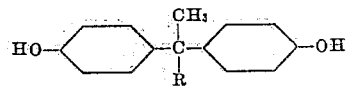

wherein R is selected from the group consisting of methyl and ethyl.

3. A plastic composition of matter comprising 100 parts of a resinous copolymer of 80 to 97% combined vinyl chloride and 20 to 3% of combined vinyl acetate, 20 to 80 parts of a neutral branched chain alkyl ester, having 7 to 13 carbon atoms per alkyl radical of which at least two carbon atoms are tertiary and having 4 to 10 carbon atoms per acyl radical, of an organic acid selected from the group consisting of dibasic and tribasic organic acids, and 0.05 to 0.5 part of a stabilizer having the formula

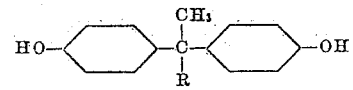

wherein R is selected from the group consisting of methyl and ethyl.

4. A plastic composition of matter comprising 100 parts of a resinous copolymer of 80 to 97% combined vinyl chloride and 20 to 3% of combined vinyl acetate, 30 to 60 parts of a neutral octyl ester of a dibasic organic acid having two tertiary carbon atoms per octyl radical and having 6 to 10 carbon atoms per acyl radical, 0.02 to 0.5 part of 2,2-bis(4-hydroxyphenyl) propane, and 0.5 to 5 parts of a hydrogen chloride acceptor in the form of a basically reacting metal salt of an organic acid.

5. A composition of matter according to claim 4 wherein the hydrogen chloride acceptor is a lead stearate.

6. A composition of matter according to claim 4 wherein the ester consists essentially of dimethyl hexyl phthalate isomers.

7. A composition of matter according to claim 6 wherein the hydrogen chloride acceptor is dibasic lead stearate.

8. A process which comprises dissolving 2,2-bis(4-hydroxyphenyl) propane in diisooctyl phthalate and thereafter mixing 30 to 60 parts of the resulting solution with 100 parts of a resinous vinyl chloride polymer at an elevated temperature to form a clear, transparent composition, the amount of bis-hydroxyphenol propane dissolved in the diisooctyl phthalate being equivalent to 0.05 to 0.5% based on the resinous polymer contained in the final composition.

WILBUR F. FISCHER.
DAVID W. YOUNG.

REFERENCES CITED

The following references are of record in the file of this patent:

UNITED STATES PATENTS

| Number | Name | Date |
|---|---|---|
| 2,126,179 | Duggan | Aug. 9, 1938 |
| 2,270,959 | Murke et al. | Jan. 27, 1942 |